United States Patent
Curran et al.

(10) Patent No.: US 9,688,538 B2
(45) Date of Patent: Jun. 27, 2017

(54) GRAFT POLYMERIZATION INITIATED ON GRAPHITIC NANOMATERIALS AND THEIR NANOCOMPOSITE FORMATION

(71) Applicants: Seamus Curran, Pearland, TX (US); Kang-Shyang Liao, Houston, TX (US); Alexander Wang, Houston, TX (US)

(72) Inventors: Seamus Curran, Pearland, TX (US); Kang-Shyang Liao, Houston, TX (US); Alexander Wang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 31 days.

(21) Appl. No.: 14/614,982

(22) Filed: Feb. 5, 2015

(65) Prior Publication Data
US 2015/0325330 A1 Nov. 12, 2015

Related U.S. Application Data

(60) Provisional application No. 61/935,953, filed on Feb. 5, 2014.

(51) Int. Cl.
*C01B 31/02* (2006.01)
*H01B 1/04* (2006.01)
(Continued)

(52) U.S. Cl.
CPC ...... *C01B 31/0273* (2013.01); *C01B 31/0484* (2013.01); *C08J 5/005* (2013.01);
(Continued)

(58) Field of Classification Search
CPC ............... H01B 1/02–1/04; H01B 1/24; C01B 31/02–31/04
(Continued)

(56) References Cited

U.S. PATENT DOCUMENTS 7,713,508 B2 5/2010 Curran et al.
2004/0126303 A1* 7/2004 Hwang ............... B82Y 30/00
423/447.2
(Continued)

FOREIGN PATENT DOCUMENTS

WO WO-2007-067079 A1 6/2007
WO WO2008/078052 * 7/2008

OTHER PUBLICATIONS

Layek ("A review on synthesis and properties of polymer functionalized graphene." Polymer, 54, pp. 5087-5103, online Jun. 28, 2013).*

(Continued)

*Primary Examiner* — Tri V Nguyen
(74) *Attorney, Agent, or Firm* — Winstead PC

(57) ABSTRACT

An improved graft polymerization method from general graphitic structures with organic based monomers through the mechanism of Reversible Addition-Fragmentation Chain Transfer (RAFT) polymerization was developed. Organic hybrid nanomaterials comprising graphitic structures are covalently bonded via chemically reactive groups on the outer walls of the structure. Methods for forming the covalently bonded structures to many organic based monomers and/or polymers may occur through RAFT polymerization utilizing dithioester as a chain transfer agent. The method may also comprise nanocomposite formation of such organic hybrid nanomaterials with common plastic(s) to form graphitic nanocomposite reinforced plastic articles.

18 Claims, 2 Drawing Sheets

(51) Int. Cl.
*B82Y 30/00* (2011.01)
*H01B 1/24* (2006.01)
*C08J 5/00* (2006.01)
*C01B 31/04* (2006.01)

(52) U.S. Cl.
CPC ............ *H01B 1/24* (2013.01); *C08J 2323/06* (2013.01); *C08J 2333/12* (2013.01); *C08J 2355/02* (2013.01); *C08J 2369/00* (2013.01)

(58) Field of Classification Search
USPC .................. 252/500–511; 423/445 R–445 B
See application file for complete search history.

(56) References Cited

U.S. PATENT DOCUMENTS

| | | | |
|---|---|---|---|
| 2006/0079626 | A1 | 4/2006 | Curran et al. |
| 2007/0298669 | A1* | 12/2007 | Barrera .................. B82Y 30/00 442/198 |
| 2008/0306225 | A1* | 12/2008 | Prud'Homme ....... C01B 31/043 526/89 |
| 2009/0124747 | A1 | 5/2009 | Khabashesku |
| 2009/0324922 | A1* | 12/2009 | Kadowaki ............. B82Y 30/00 428/220 |
| 2010/0234503 | A1* | 9/2010 | Khabashesku ......... B82Y 30/00 524/213 |
| 2011/0046316 | A1* | 2/2011 | Schierholz ............. B82Y 30/00 525/452 |
| 2012/0114947 | A1 | 5/2012 | Jenninger et al. |
| 2012/0171103 | A1* | 7/2012 | Zhao ...................... B82Y 10/00 423/415.1 |
| 2013/0108865 | A1* | 5/2013 | Boulanger ......... B01D 67/0079 428/340 |
| 2013/0155578 | A1* | 6/2013 | Tsai ....................... H01G 11/24 361/502 |
| 2014/0073746 | A1* | 3/2014 | Nakasuga ............. C08F 292/00 525/418 |
| 2015/0017386 | A1* | 1/2015 | Kolb ....................... C08J 7/047 428/149 |

OTHER PUBLICATIONS

Ou ("Covalent functionalization of graphene with poly(methyl methacrylate) by atom transfer radical polymerization at room temperature." Polymer Chem, 3, pp. 2768-2775, 2012).*
Beckert ("Sulfur-Functionalized Graphenes as Macro-Chain-Transfer and RAFT Agents for Producing Graphene Polymer Brushes and Polystyrene Nanocomposites." Macromolecules, 45, pp. 7083-7090, pub Aug. 30, 2012).*
You, Y-Z. et al., "Functionalization of carbonnanotubes with well-defined functional polymers via thiol-coupling react ion," Macromolecular Rapid Communications, 2006, vol. 27, pp. 2001-2006.
You, Y-Z et al., "Preparation of Smart Polymer/Carbon Nanotube Conjugates via Stimuli-Responsive Linkages," Advanced Functional Materials, 2007, vol. 17, pp. 2470-2477.
Xu, G. et al., "Fabrication of multiwalled carbon nanotubes with polymer shells through surface RAFT polymerization," Polymer International, 2007, vol. 56, pp. 847-852.
Pei, X. et al., "Preparation and characterization of carbon nanotubespolymer/Ag hybrid nanocomposites via surface RAFT polymerization," Journal of Physical Chemistry C, 2007, vol. 111, pp. 2947-2952.
Curran S., Zhang D., Wondmageg, W. T., Ellis, A. V., Cech J., Roth S., Carroll D. L., J. Mater. Res. 2006 21, 1071-1077.

* cited by examiner

| Mixture with loadings (%) | Conductivity (S/m) |
|---|---|
| 12 | $3.9 \times 10^{-4}$ |
| 14 | 5.7 |
| 36 | $1.7 \times 10^4$ |
| 47 | $2.1 \times 10^4$ |
| 71 | $1.8 \times 10^4$ |
| 89 | $2.4 \times 10^4$ |
| 99 | $2.2 \times 10^4$ |

FIG. 3

GRAFT POLYMERIZATION INITIATED ON GRAPHITIC NANOMATERIALS AND THEIR NANOCOMPOSITE FORMATION

RELATED APPLICATIONS

This application claims the benefit of U.S. Provisional Patent Application No. 61/935,953, filed on Feb. 5, 2014, which is incorporated herein by reference.

STATEMENT REGARDING FEDERALLY SPONSORED RESEARCH

This invention was made with government support under Grant No. DD-N000141110069 from the Office of Naval Research at the US Department of Defense. The government has certain rights in the invention.

FIELD OF THE INVENTION

The present invention is directed to graft polymerization initiated on graphitic nanomaterials and their nanocomposite formation with plastics.

BACKGROUND OF THE INVENTION

In the previous invention entitled "Thiation of Carbon Nanotubes and Composite Formation" (U.S. Pat. No. 7,713,508 B2), graft polymerization initiated on dithioester-functionalized carbon nanotubes and their composite formation was first described by Curran, et al. Dithiocarboxylic ester formation catalyzed by phosphorus pentasulfide was well documented for various alcohols and carboxylic acid. The role of phosphorus pentasulfide was proposed to be activation of carboxylic functional group for nucleophilic attack and thiation of hydroxyl and carbonyl functional groups. Utilizing dithioester as a chain transfer agent for living free-radical polymerization of monomers, preferably through the mechanism of Reversible Addition-Fragmentation Chain Transfer (RAFT) polymerization, multi-walled carbon nanotube-polystyrene (MWCNT-PS) was synthesized and their composite formation with polystyrene was well characterized (J. Mater. Res. 2006 21, 1071-1077). Thin films made from the composite with low MWCNT loadings (less than 0.9 wt. %) were optically transparent and no evidence of aggregation of nanotubes in the thin film or solution was observed. The result from the conductivity measurement as a function of MWCNT loadings suggests two charge transport mechanisms: charge hopping in low MWCNT loadings (0.02-0.6 wt. %) and ballistic quantum conduction in high loadings (0.6-0.9 wt. %). The composite exhibits dramatically enhanced conductivity up to 33 S/m at a low MWCNT loading (0.9 wt. %).

An improved method was developed to connect general graphitic structures to other organic based monomers. The present invention comprises organic hybrid nanomaterials with graphitic structures covalently bonded via chemically reactive groups on the outer walls of the structure and methods for forming the covalently bonded structures to many other organic based monomers and/or polymers through RAFT polymerization utilizing dithioester as a chain transfer agent. The present invention also comprises nanocomposite formation of such organic hybrid nanomaterials with plastic to form graphitic nanocomposite reinforced plastic articles.

SUMMARY OF THE INVENTION

In some embodiments, graphitic nanomaterials may comprise at least one type of material that is rich in carbon content that is densely packed in a regular $sp^2$-bonded structure. Examples of such materials include, but are not limited to, carbon black, carbon fiber, graphite, graphene, graphene oxides, carbon nanotubes, fullerenes and their derivatives.

In some embodiments, graphitic nanocomposites may comprise at least two covalently linked structures. As a nonlimiting example, the structures may be linked with a dithioester having a formula such as:

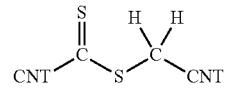

Here carbon nanotubes (CNTs) are used as an example to represent the graphitic materials. A similar formula should apply to all other graphitic nanomaterials listed above.

In some embodiments, a method of functionalizing graphitic materials comprise thiolating the surface of graphitic materials with phosphorus pentasulfide ($PL_4S_{10}$), Lawesson's reagent: 2,4-bis(4-methoxyphenyl)-1,3,2,4-dithiadiphosphetane-2,4-disulfide ($C_{14}H_{14}O_2P_2S_4$), Belleau's Reagent: 2,4-Bis(4-phenoxyphenyl)-1,3-dithia-2,4-diphosphetane-2,4-disulfide ($C_{24}H_{18}O_2P_2S_4$) or Davy's Reagent: 2,4-Bis(methylthio)-1,3,2,4-dithiadiphosphetane-2,4-disulfide ($C_2H_6P_2S_6$). In some embodiments, the method may comprise carboxylizing the graphitic materials prior to reacting with phosphorus pentasulfide or other reagents in an organic solution. The graphitic materials are reacted with the phosphorus pentasulfide or other reagents in an organic solution comprising anhydrous toluene or N-methyl-2-pyrrolidone. The solution is refluxed. For example, the solution may be refluxed for equal to or between approximately 12 and 48 hours at temperatures equal to or between about 110 and 200° C.

In some embodiments, the method further comprises polymerizing the dithioester-functionalized graphitic materials utilized dithioester as a chain transfer agent for living free-radical polymerization of monomers, such as through the mechanism of RAFT polymerization.

In some embodiments, the dithioester-functionalized graphitic materials are sonicated with at least one type of organic monomers and at least one type of free-radical initiators in an organic solution comprising anhydrous toluene, N-methyl-2-pyrrolidone, N,N-dimethylformamide, N,N-dimethylacetamide, 4-butyrolactone or 1,3-dimethyl-2-imidazolidinone.

In some embodiments, the reaction mixture comprising the dithioester-functionalized graphitic materials, the monomers and the free-radical initiators is refluxed. For example, the solution may be refluxed for equal to or between approximately 12 and 48 hours at temperatures equal to or between about 110 and 200° C. The reaction mixture is then cooled and tetrahydrofuran is added to the reaction mixture. The reaction mixture is added to methanol and a polymerized graphitic nanocomposite is precipitated and dried.

In some embodiments, the polymerized graphitic nanomaterial is mixed with their corresponding polymers in a ratio equal to or between about 1 and 99 wt. % to produce common plastic articles. In some embodiments, the polymerized graphitic nanomaterial is mixed with their corresponding polymers in a ratio equal to or between about 10 and 99 wt. % to produce common plastic articles. In some embodiments, the polymerized graphitic nanomaterial is mixed with their corresponding polymers in a ratio equal to or between about 20 and 99 wt. % to produce common plastic articles. In some embodiments, the polymerized graphitic nanomaterial is mixed with their corresponding polymers in a ratio equal to or between about 30 and 99 wt. % to produce common plastic articles. In some embodiments, the polymerized graphitic nanomaterial is mixed with their corresponding polymers in a ratio equal to or between about 40 and 99 wt. % to produce common plastic articles. In some embodiments, the polymerized graphitic nanomaterial is mixed with their corresponding polymers in a ratio equal to or between about 50 and 99 wt. % to produce common plastic articles. Further, in some embodiments, the abovenoted polymerized graphitic nanomaterial to corresponding polymers ratio may be sufficient to produce common plastic articles that exhibit conductivity equal to or greater than 1 S/m. In some embodiments, the polymerized graphitic nanomaterial to corresponding polymers ratio may be equal to or between about 1 to 50 wt. %. In some embodiments, the abovenoted polymerized graphitic nanomaterial to corresponding polymers ratio may be sufficient to produce common plastic articles that exhibit improved physical strength equal to or greater than 1% comparing to the original plastic without graphitic nanomaterials. In some embodiments, the polymerized graphitic nanomaterial to corresponding polymers ratio may be equal to or between about 1 to 30 wt. %. In some embodiments, the abovenoted polymerized graphitic nanomaterial to corresponding polymers ratio may be sufficient to produce common plastic articles which exhibit lower plastic processing temperature equal to or greater than 1° C. comparing to the original plastic without graphitic nanomaterials. In some embodiments, the polymerized graphitic nanomaterial to corresponding polymers ratio may be equal to or between about 1 to 10 wt. %. In some embodiments, the abovenoted polymerized graphitic nanomaterial to corresponding polymers ratio may be sufficient to produce common plastic articles that may change the color or transparency of the original plastic without graphitic nanomaterials. In some embodiments, various graphitic nanomaterial(s) may be utilized to form polymerized articles with the graphitic nanocomposite by following similar procedures discussed above.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 3 shows a table with the conductivity values calculated for each of seven MWCNT-PODA composites with different MWCNT loadings.

DETAILED DESCRIPTION OF THE INVENTION

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Methods and composition for producing graphitic nanocomposite reinforced plastic articles are discussed herein. The present invention offers new compositions and methods for making graphitic nanocomposites with common plastic polymers.

In some embodiments, graphitic nanomaterials may comprise at least one type of material that is rich in carbon content that is densely packed in a regular $sp^2$-bonded structure. Examples of such graphitic nanomaterials include, but are not limited to, carbon black, carbon fiber, graphite, graphene, graphene oxides, carbon nanotubes, fullerenes and/or their derivatives.

In some embodiments, graphitic nanocomposites may comprise at least two covalently linked structures. In some embodiments, the structures may be linked with a dithioester having a formula such as:

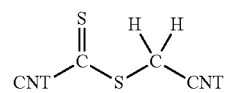

Carbon nanotubes (CNTs) are used as a nonlimiting example to represent the graphitic materials and linking structure in the formula above. It will be recognized by one of ordinary skill in the art that a similar formula may apply to all other graphitic nanomaterials discussed previously above.

Figure 1:
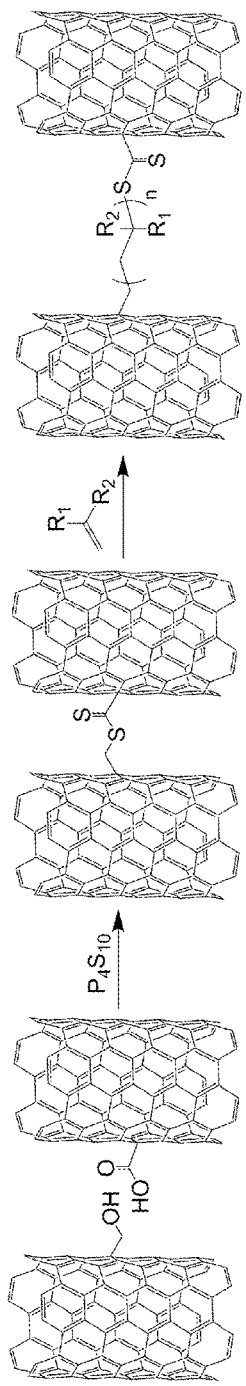
FIG. 1 shows a schematic illustration of the mechanism of an embodiment for the formation of dithioester and the covalent bonding of carbon nanotubes followed by the reversible addition-fragmentation chain transfer polymerization of suitable monomers ($CH_2=CR_1R_2$) to form the polymerized carbon nanotube nanomaterial.
Figure 2:
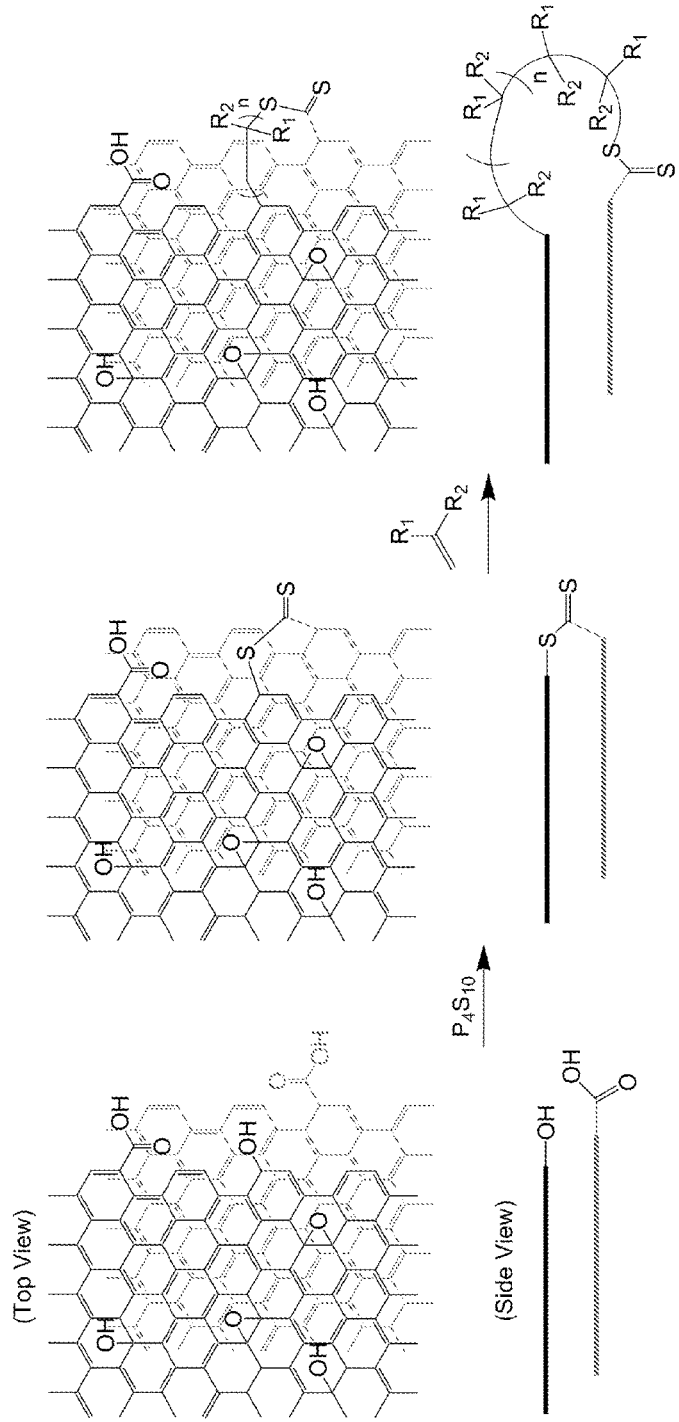
FIG. 2 shows a schematic illustration of the mechanism of an embodiment for the formation of dithioester and the covalent bonding of graphene/graphene oxide followed by the reversible addition-fragmentation chain transfer (RAFT) polymerization of suitable monomers ($CH_2=CR_1R_2$) to form the polymerized graphene/graphene oxide nanomaterial.

In some embodiments, a method of functionalizing graphitic materials comprises thiolating the surface of graphitic materials as shown in illustrative embodiments provided in FIGS. 1 and 2. In particular, FIG. 1 illustrates an embodiment for carbon nanotubes, and FIG. 2 illustrates an embodiment for graphene/graphene oxide. As a nonlimiting example, graphitic materials may be functionalized with phosphorus pentasulfide ($P_4S_{10}$), Lawesson's reagent: 2,4-bis(4-methoxyphenyl)-1,3,2,4-dithiadiphosphetane-2,4-disulfide ($C_{14}H_{14}O_2P_2S_4$), Belleau's Reagent: 2,4-Bis(4-phenoxyphenyl)-1,3-dithia-2,4-diphosphetane-2,4-disulfide ($C_{24}H_{18}O_2P_2S_4$) or Davy's Reagent: 2,4-Bis(methylthio)-1,3,2,4-dithiadiphosphetane-2,4-disulfide ($C_2H_6P_2S_6$). In some embodiments, the method may comprise carboxylizing the graphitic materials prior to reacting with phosphorus pentasulfide or other reagents in an organic solution. The graphitic materials may be reacted with the phosphorus pentasulfide or other reagents in an organic solution comprising anhydrous toluene, N-methyl-2-pyrrolidone, N,N-dimethylformamide, N,N-dimethylacetamide, 4-butyrolactone or 1,3-dimethyl-2-imidazolidinone.

The solution is refluxed. For example, the solution may be refluxed for equal to or between approximately 12 and 48 hours at temperatures equal to or between about 110 and 200° C.

In some embodiments, the method further comprises polymerizing the dithioester-functionalized graphitic materials utilized dithioester as a chain transfer agent for living free-radical polymerization of monomers, such as through the mechanism of Reversible Addition-Fragmentation Chain Transfer (RAFT) polymerization.

In some embodiments, the dithioester-functionalized graphitic materials are sonicated with at least one type of monomers and at least one type of free-radical initiators in an organic solution comprising anhydrous toluene, N-methyl-2-pyrrolidone, N,N-dimethylformamide, N,N-dimethylacetamide, 4-butyrolactone or 1,3-dimethyl-2-imidazolidinone. The monomers may be methacrylates, methacrylamides, acrylonitrile, styrene, butadiene, vinyl acetate, octadecyl acrylate, and/or their derivatives. The free-radical initiators may be azobisisobutyronitrile (AIBN), 4,4'-azobis(4-cyanovaleric acid), 1,1'-azobis(cyclohexanecarbonitrile), or 2,2'-azobis(2-methylpropionamidine) dihydrochloride.

In some embodiments, the reaction mixture comprising the dithioester-functionalized graphitic materials, the monomers and the free-radical initiators is refluxed. For example, the solution may be refluxed for equal to or between approximately 12 and 48 hours at temperatures equal to or between about 110 and 200° C. The reaction mixture is cooled and tetrahydrofuran is added to the reaction mixture. The reaction mixture is added to methanol and a polymerized graphitic nanocomposite is precipitated and dried.

In some embodiments, the polymerized graphitic nanomaterial (which may also be referred to herein as graphitic material, MWCNT, or CNT loading or the like) is mixed with their corresponding polymers in a ratio equal to or between about 1 and 99 wt. % to produce common plastic articles. In some embodiments, the polymerized graphitic nanomaterial is mixed with their corresponding polymers in a ratio equal to or between about 10 and 99 wt. % to produce common plastic articles. In some embodiments, the polymerized graphitic nanomaterial is mixed with their corresponding polymers in a ratio equal to or between about 20 and 99 wt. % to produce common plastic articles. In some embodiments, the polymerized graphitic nanomaterial is mixed with their corresponding polymers in a ratio equal to or between about 30 and 99 wt. % to produce common plastic articles. In some embodiments, the polymerized graphitic nanomaterial is mixed with their corresponding polymers in a ratio equal to or between about 40 and 99 wt. % to produce common plastic articles. In some embodiments, the polymerized graphitic nanomaterial is mixed with their corresponding polymers in a ratio equal to or between about 50 and 99 wt. % to produce common plastic articles. Further, in some embodiments, the abovenoted polymerized graphitic nanomaterial to corresponding polymers ratio may be sufficient to produce common plastic articles that exhibit conductivity equal to or greater than 1 S/m. In some embodiments, the polymerized graphitic nanomaterial to corresponding polymers ratio may be equal to or between about 1 to 50 wt. %. In some embodiments, the abovenoted polymerized graphitic nanomaterial to corresponding polymers ratio may be sufficient to produce common plastic articles that exhibit improved physical strength equal to or greater than 1% comparing to the original plastic without graphitic nanomaterials. In some embodiments, the polymerized graphitic nanomaterial to corresponding polymers ratio may be equal to or between about 1 to 30 wt. %. In some embodiments, the abovenoted polymerized graphitic nanomaterial to corresponding polymers ratio may be sufficient to produce common plastic articles which exhibit lower plastic processing temperature equal to or greater than 1° C. comparing to the original plastic without graphitic nanomaterials. In some embodiments, the polymerized graphitic nanomaterial to corresponding polymers ratio may be equal to or between about 1 to 10 wt. %. In some embodiments, the abovenoted polymerized graphitic nanomaterial to corresponding polymers ratio may be sufficient to produce common plastic articles that may change the color or transparency of the original plastic without graphitic nanomaterials. In some embodiments, various graphitic nanomaterial(s) may be utilized to form polymerized articles with the graphitic nanocomposite by following similar procedures discussed above. The polymers are selected from those that are suitable for mixing with graphitic nanomaterials. The polymers may include, but are not limited to, polyethylene (PE), poly(methyl methacrylate) (PMMA), acrylonitrile-butadiene-styrene copolymers (ABS), polycarbonate (PC), polyurethane (PU), any other suitable polymers, and/or combinations thereof. In some embodiments, various graphitic nanomaterial(s) may be utilized to form polymerized articles with the graphitic nanocomposite by following similar procedures discussed above. However, processing conditions may be adjusted accordingly after the introduction of the polymerized graphitic nanomaterial in order to achieve desired properties.

In some embodiments, to form a desired shape of the graphitic nanocomposite article for testing or commercial use, the polymerized graphitic nanomaterial/polymer mixture may be poured into a mold or undergo a molding process, such as injection molding, compression molding, extrusion, or the like, to form a free standing bulk article. In some embodiments, the free standing bulk article may have a volume equal to or between about 1 $cm^3$ to 100 $m^3$. In some embodiments, the polymerized graphitic nanomaterial/polymer mixture may be deposited on a flat substrate to form a thin film coating. In some embodiments, the thin film coating may have a thickness equal to or between about 1 nm and 1 mm. The method of depositing the thin film coating may comprise, but is not limited to, drop-casting, spin-coating, doctor-blading, inkjet-printing or spraying. Depending on the processes to produce each type of articles, the solvent may be removed and the mixture may be cured at a set temperature equal to or between about 25 and 400° C. for a period of time equal to or between about 1 second and 24 hours.

In some embodiments, one or more functional additives may be added into the polymerized graphitic nanomaterial/polymer mixture. The functional additives do not impair the original functions of the resulting nanocomposite. Here the functional additives may have the properties of, but not limited to, UV absorbing/blocking, anti-reflective, fire-retardant, conducting, and/or anti-microbial. The additives can be composed of, but are not limited to, organic/inorganic molecules/polymers having molecular weight up to about 100,000 Da; organic micro/nano materials in their natural or synthetic forms (e.g. particles, nanotubes and nanosheets) having sizes equal to or between about 1 nm and 500 μm; and/or metal/metal oxide micro/nano materials (e.g. silver, titanium oxide, zinc oxide, aluminum oxide and clay) in their natural or synthetic forms (e.g. particles, nanotubes and nanosheets) having sizes equal to or between about 1 nm and 500 μm.

In some embodiments, the methods to produce graphitic nanocomposites with common plastics can vary depending on the articles of interest, which are listed individually in the following experimental examples. The solution/mixture described below used to produce such articles may vary in their chemical constituents, concentration of reagents in solution/mixture, and deposition procedure. The following sections are structured and arranged by the particular material type. Correspondingly, discussion about the composition of material, particular chemical solution/mixture used, and/or depositional procedure for various material types is provided below.

EXPERIMENTAL EXAMPLE

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

CNTs: The following describes an exemplary procedure to prepare dithioester-functionalized multi-walled carbon nanotubes (MWCNTs). Purified MWCNTs were first oxidized in concentrated $H_2SO_4/HNO_3$ (7:3 v/v) solution by sonication (12 h, 130 W) to form carboxylic acid (—COOH) and hydroxyl (—OH) functional groups on the nanotube surface. The MWCNTs may be provided by any suitable method, such as synthesis by chemical vapor deposition (CVD) or an arc discharge method. In some embodiments, the oxidation may not be required if enough carboxylic acid and hydroxyl functional groups already exist in the MWCNTs as received. The suspension was diluted with deionized water and filtered under vacuum through a nylon microfilter (0.2 μm) and washed thoroughly with more deionized water. To form the dithiocarboxylic ester linkage, synthesis of thiolated MWCNTs was achieved by adding dried carboxylated MWCNTs to anhydrous toluene and phosphorus pentasulfide in a round bottomed flask. The resulting mixture was refluxed at 140° C. for 48 hours. The reaction mixture was then cooled and filtered under vacuum through a nylon microfilter (0.2 μm) and the product was washed thoroughly with anhydrous toluene and dried. The thiolated MWCNTs were then stored in a desiccator under nitrogen before use.

Graphene/graphene oxide: The following describes an exemplary procedure to prepare dithioester-functionalized graphene/graphene oxide. Using liquid-phase exfoliation of graphite in common organic solvent such as N-methyl-2-pyrrolidone, graphene/graphene oxide dispersion can be produced through sonication (24 h, 130 W). To form the dithiocarboxylic ester linkage, synthesis of thiolated graphene/graphene oxide was achieved by adding phosphorus pentasulfide into graphene/graphene oxide dispersion in N-methyl-2-pyrrolidone in a round bottomed flask. The resulting mixture was heated at 140° C. for 48 hours. The reaction mixture was then cooled and filtered under vacuum through a nylon microfilter (0.2 μm) and the product was washed thoroughly with methanol and dried. The thiolated graphene/graphene oxide was then stored in a desiccator under nitrogen before use.

CNT and styrene polymerization: The following describes an exemplary procedure to prepare polymerized MWCNT nanomaterial with styrene. In some embodiments, the procedure can also be used to produce polymerized MWCNT nanomaterial with other monomers, such as methacrylates, methacrylamides, acrylonitrile, butadiene, vinyl acetate, octadecyl acrylate, or the like. Dithioester-functionalized MWCNTs and the radical initiator azobisisobutyronitrile (AIBN) were first added into the Schlenk flask with stirrer bar and the air was pumped out of the flask and replaced the resulting vacuum with an inert gas (Argon or Nitrogen) and anhydrous toluene was added. The resulting mixture was first sonicated (10 s, 130 W) and styrene (after removal of inhibitor) in different molar ratios was added before the flask was sealed. The mixture was heated at 110° C. in a silicon oil bath for 24 hours with continual stirring. The reaction mixture was cooled before adding the tetrahydrofuran, and the resulting mixture was slowly added to methanol and precipitate formed. The precipitate was filtered and volatile materials were removed under vacuum to yield the light grey powder as the MWCNT-polystyrene (MWCNT-PS) nanomaterial.

Graphene/graphene oxide and styrene polymerization: The following describes an exemplary procedure to prepare polymerized graphene/graphene oxide nanomaterial with styrene. The procedure can also be used to produce polymerized graphene/graphene oxide nanomaterial with other monomers, such as methacrylates, methacrylamides, acrylonitrile, butadiene, vinyl acetate, octadecyl acrylate, or the like. Dithioester-functionalized graphene/graphene oxide and the radical initiator azobisisobutyronitrile (AIBN) were first added into the Schlenk flask with stirrer bar and the air was pumped out of the flask and replaced the resulting vacuum with an inert gas (Argon or Nitrogen) and anhydrous toluene was added. The resulting mixture was first sonicated (10 s, 130 W) and styrene (after removal of inhibitor) in different molar ratio was added before the flask was sealed. The mixture was heated at 110° C. in a silicon oil bath for 24 hours with continual stirring. The reaction mixture was cooled before adding the tetrahydrofuran, and the resulting mixture was slowly added to methanol and precipitate formed. The precipitate was filtered and volatile materials were removed under vacuum to yield the light grey powder as the graphene/graphene oxide-polystyrene (graphene/graphene oxide-PS) nanomaterial.

CNT and octadecyl acrylate polymerization: The following describes an exemplary procedure to prepare polymerized MWCNT nanomaterial with octadecyl acrylate. Dithioester-functionalized MWCNTs, octadecyl acrylate (in different molar ratios comparing to dithioester-functionalized MWCNTs) and the radical initiator azobisisobutyronitrile (AIBN) were first added into the Schlenk flask with stirrer bar and the air was pumped out of the flask and replaced the resulting vacuum with an inert gas (Argon or Nitrogen) and anhydrous toluene was added before the flask was sealed. The resulting mixture was first sonicated (10 s, 130 W) and then heated at 120° C. in a silicon oil bath for 20 hours with continual stirring. The reaction mixture was cooled and slowly added to methanol to form precipitate.

The precipitate was filtered and volatile materials were removed under vacuum to yield the grey powder as the MWCNT-poly(octadecyl acrylate) (MWCNT-PODA) nanomaterial. Assuming fully recovery of the MWCNT-PODA, the loadings of the MWCNT to the final polymer composite can be calculated. The product from seven batches of the polymerization was collected separately and the loadings or ratio of the MWCNT to the final polymer composite product are 12, 14, 36, 47, 71, 89 and 99%, respectively.

Melting point measurements of MWCNT-PODA composite: The melting points of MWCNT-PODA composite samples were determined by visually observing the onset of a phase change from a solid to a liquid. A vial containing a known amount of composite sample was tightly bound to the probe of a digital thermometer using two nylon zip ties. The probe/sample system was then immersed in a silicone oil bath to promote uniform heating of the sample. The oil bath was heated/stirred using a hotplate/magnetic stirrer. An additional glass alcohol-thermometer was used as a reference to corroborate the temperature readings outputted by the digital thermometer. The MWCNT-PODA composite with MWCNT loadings of 12% displayed a melting point of 48.9±1.0° C. The MWCNT-PODA composite with MWCNT loadings of 14% displayed a melting point of 53.1±1.0° C. No change was visually observable for MWCNT-PODA composites with MWCNT loadings of 36, 47, 71, 89 and 99%, even after heating the oil bath to ~200° C.

Electrical conductivity measurements of MWCNT-PODA composite: The electrical conductivity of MWCNT-PODA nanocomposite materials were calculated using measured values of the resistance across each of seven different experimental mixtures differing only in MWCNT loading. Samples for electronic characterization were prepared by adding ~500 µL of hexane to ~30 mg of each of the dry experimental mixtures. Three samples were prepared for each of the seven different filler-loadings via drop-casting of ~50 µL aliquots of the respective mixture between pairs of thin-film gold (Au) electrodes on a glass substrate, yielding a total of 21 composite samples. Once drop-casted onto the characterization devices, the samples were allowed air-dry at room conditions (~20° C., relative humidity (RH) ~55%) for 5 minutes prior to curing in a ventilated oven at 60° C. for 10 minutes. After curing, compact, hard, and uniform composites were obtained for certain filler-loadings. All mixtures with MWCNT-loadings equal or more than 47% formed brittle films that exhibited a high degree of cracking/fracturing, which was observed to increase proportionally with increasing filler-loading. Thin-film Au electrodes were prepared via evaporation under high-vacuum. The dimensional parameters of the thin-film Au electrodes were previously characterized using a high-precision profilometer. The values of thin-film thickness and inter-electrode gap were used in calculating the electrical conductivity of each sample. Resistance measurements were taken using the two-point probe setup and a picoammeter/sourcemeter. The conductivity values calculated for each of the seven experimental mixtures are summarized in the table provided in FIG. 3.

Graphitic nanocomposite reinforced polyethylene: The following describes an exemplary procedure to prepare graphitic nanocomposite reinforced polyethylene (PE) articles. The polymerized graphitic nanomaterials, such as MWCNT-poly(octadecyl acrylate) or graphene/graphene oxide-poly(octadecyl acrylate), are mixed with commercial grade PE pellets in a ratio between about 1 and 99% in elevated temperature above the melting temperature of the commercial grade PE (between about 105 and 180° C.). The resulting mixture was then fed into the molding processes including injection molding, compression molding, and extrusion to produce the graphitic nanocomposite reinforced PE articles.

Graphitic nanocomposite reinforced poly(methyl methacrylate): The following describes an exemplary procedure to prepare graphitic nanocomposite reinforced poly(methyl methacrylate) (PMMA, commonly called acrylic glass or Plexiglass) articles. The polymerized graphitic nanomaterials, such as MWCNT-poly(methyl methacrylate) or graphene/graphene oxide-poly(methyl methacrylate), are mixed with PMMA in a ratio between about 1 and 99% in elevated temperature above the glass transition temperature of the commercial grade PMMA (between about 85 and 165° C.). The resulting mixture was then feed into the molding processes including injection molding, compression molding, and extrusion to produce the graphitic nanocomposite reinforced PMMA articles.

Graphitic nanocomposite reinforced polycarbonate: The following describes an exemplary procedure to prepare graphitic nanocomposite reinforced polycarbonate (PC) articles. The polymerized graphitic nanomaterials, such as MWCNT-PS or graphene/graphene oxide-PS, are mixed with commercial grade PC pellets in a ratio between about 1 and 99% in elevated temperature above the glass transition temperature of the commercial grade PC (between about 147 and 155° C.). The resulting mixture was then feed into the molding processes including injection molding, compression molding, and extrusion to produce the graphitic nanocomposite reinforced PC articles.

Graphitic nanocomposite reinforced acrylonitrile-butadiene-styrene copolymers: The following describes an exemplary procedure to prepare graphitic nanocomposite reinforced acrylonitrile-butadiene-styrene copolymers (ABS) articles. The polymerized graphitic nanomaterials, such as MWCNT-polybutadiene, MWCNT-polyacrylonitrile and MWCNT-PS or graphene/graphene oxide-polybutadiene, graphene/graphene oxide-polyacrylonitrile and graphene/graphene oxide-PS, are mixed with commercial grade ABS pellets in a ratio between about 1 and 99% in elevated temperature above the glass transition temperature of the commercial grade ABS (~105° C.). The resulting mixture was then feed into the molding processes including injection molding, compression molding, and extrusion to produce the graphitic nanocomposite reinforced ABS articles.

Graphitic nanocomposite reinforced polyurethane: The following describes an exemplary procedure to prepare graphitic nanocomposite reinforced polyurethane (PU) articles. The polymerized graphitic nanomaterials, such as MWCNT-polymethacrylamide and MWCNT-poly(vinyl acetate) or graphene/graphene oxide-polymethacrylamide and graphene/graphene oxide-poly(vinyl acetate), are mixed with a ratio between about 1 and 99% into either the isocyanate or the polyols liquid streams of the polyurethane resin blend system including additives, such as chain extenders, cross linkers, surfactants, flame retardants and/or blowing agents. Until a homogeneous blend is obtained, the reacting liquid mixture is dispensed into a mold. After curing, the finished articles are demolded to produce the graphitic nanocomposite reinforced PU articles.

What is claimed is:

1. A method for forming a graphitic nanocomposite comprising:
   functionalizing at least one graphitic nanomaterial, wherein the at least one graphitic nanomaterial is functionalized by thiolating a surface; and mixing the at least one graphitic nanomaterial with at least one free-radical initiator and at least one type of monomer in at least one type of organic solution to provide a reaction mixture, wherein the reaction mixture forms a polymerized graphitic nanocomposite, the at least one graphitic nanomaterial is linked to another graphitic nanomaterial by a linking structure, and the at least one free-radical initiator is azobisisobutyronitrile (AIBN), 4,4'-azobis(4-cyanovaleric acid), 1,1'-azobis (cyclohexanecarbonitrile), or 2,2'-azobis(2-methylpropionamidine) dihydrochloride, wherein further the linking structure comprises a dithioester and the at least one type of monomer, and a ratio of the at least one graphitic nanomaterial to a polymer provided by the graphitic nanocomposite is equal to or between about 10 to 30%.

2. The method of claim 1, wherein the polymerized graphitic nanocomposite exhibits conductivity equal to or greater than 1 S/m.

3. The method of claim 1, wherein the polymerized graphitic nanocomposite has a processing temperature equal to or greater than 1° C.

4. The method of claim 1, wherein the polymerized graphitic nanocomposite exhibits improved physical strength equal to or greater than 1% in comparison to a polymer of the at least one monomer.

5. The method of claim 1, wherein a ratio of the at least one graphitic nanomaterial to a polymer provided by the graphitic nanocomposite is equal to or between about 20 to 30%.

6. The method of claim 2, wherein the polymerized graphitic nanocomposite has a color or transparency different from a polymer of the at least one type of monomer without the graphitic nanomaterials.

7. The method of claim 1, wherein the mixing step provides for Reversible Addition-Fragmentation Chain Transfer (RAFT) polymerization.

8. The method of claim 1, wherein the at least one graphitic nanomaterial is carbon black, carbon fiber, graphite, graphene, graphene oxides, carbon nanotubes, or fullerenes.

9. The method of claim 1, wherein the functionalizing step is performed with phosphorus pentasulfide ($P_4S_{10}$), Lawesson's reagent: 2,4-bis(4-methoxyphenyl)-1,3,2,4-dithiadiphosphetane-2,4-disulfide ($C_{14}H_{14}O_2P_2S_4$), Belleau's Reagent: 2,4-Bis(4-phenoxyphenyl)-1,3-dithia-2,4-diphosphetane-2,4-disulfide ($C_{24}H_{18}O_2P_2S_4$) or Davy's Reagent: 2,4-Bis(methylthio)-1,3,2,4-dithiadiphosphetane-2,4-disulfide ($C_2H_6P_2S_6$).

10. The method of claim 1, wherein the at least one graphitic nanomaterial is carboxylized prior to the functionalizing step.

11. The method of claim 1, wherein the at least one type of monomer is a methacrylate, methacrylamide, acrylonitrile, styrene, butadiene, vinyl acetate, or octadecyl acrylate.

12. The method of claim 1, wherein the at least one organic solution is toluene, N-methyl-2-pyrrolidone, N,N-dimethylformamide, N,N-dimethylacetamide, 4-butyrolactone or 1,3-dimethyl-2-imidazolidinone.

13. The method of claim 1, wherein the polymerized graphitic nanocomposite comprises a polymer selected from polyethylene (PE), poly(methyl methacrylate) (PMMA), acrylonitrile-butadiene-styrene copolymers (ABS), polycarbonate (PC), or polyurethane (PU).

14. The method of claim 1, wherein the reaction mixture is refluxed for equal to or between 12 to 48 hours.

15. The method of claim 1, wherein the reaction mixture is refluxed at temperatures equal to or between 110 to 200° C.

16. The method of claim 14, further comprising:
cooling the reaction mixture;
adding tetrahydrofuran to the reaction mixture;
adding the reaction mixture to methanol; and
precipitating a polymerized graphitic nanocomposite.

17. The method of claim 1, further comprising:
removing solvents from the reaction mixture; and
curing the reaction mixture at a temperature equal to or between 25-400° C.

18. The method of claim 17, wherein the reaction mixture is cured for 1 second to 24 hours.

* * * * *